United States Patent
Kim et al.

(10) Patent No.: US 10,104,573 B2
(45) Date of Patent: Oct. 16, 2018

(54) WIRELESS NETWORK THROUGHPUT ESTIMATION

(71) Applicant: Apple Inc., Cupertino, CA (US)

(72) Inventors: Yuchul Kim, Santa Clara, CA (US); Joonsuk Kim, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 14/790,882

(22) Filed: Jul. 2, 2015

(65) Prior Publication Data

US 2016/0007359 A1    Jan. 7, 2016

Related U.S. Application Data (60) Provisional application No. 62/020,423, filed on Jul. 3, 2014.

(51) Int. Cl.
| | |
|---|---|
| *H04W 72/04* | (2009.01) |
| *H04W 28/02* | (2009.01) |
| *H04W 24/02* | (2009.01) |
| *H04W 24/04* | (2009.01) |
| *H04W 88/08* | (2009.01) |

(52) U.S. Cl.
CPC ....... *H04W 28/0289* (2013.01); *H04W 24/04* (2013.01); *H04W 28/0205* (2013.01); *H04W 28/0231* (2013.01); *H04W 88/08* (2013.01)

(58) Field of Classification Search
None
See application file for complete search history.

(56) References Cited

U.S. PATENT DOCUMENTS

| | | |
|---|---|---|
| 7,020,439 B2 | 3/2006 | Sinivaara et al. |
| 8,023,426 B2 | 9/2011 | Liu et al. |
| 2006/0187873 A1 | 8/2006 | Friday et al. |

(Continued)

FOREIGN PATENT DOCUMENTS

| | | |
|---|---|---|
| EP | 2768256 A1 | 8/2014 |
| WO | 2014177208 | 11/2014 |

OTHER PUBLICATIONS

Extended Search Report, European Application No. 15173757.4, dated Nov. 10, 2015, 15 pages.

(Continued)

*Primary Examiner* — George C Atkins
(74) *Attorney, Agent, or Firm* — Meyertons Hood Kivlin Kowert & Goetzel, P.C.; Jeffrey C. Hood (57) ABSTRACT

This disclosure relates to estimating throughput of wireless networks by a wireless device. According to some embodiments, estimated uplink and downlink actual temporal load available to a wireless device in a wireless network may be determined. An uplink data rate and a downlink data rate of the wireless device in the wireless network may be estimated. Based on the estimated uplink and downlink actual temporal load available to the wireless device and the estimated uplink and downlink data rates of the wireless device, the maximum possible uplink throughput and downlink throughput of the wireless device in the wireless network may be estimated. Such throughput estimates may be used to select a wireless network to join from among multiple available wireless networks or to select an initial data rate for an application executing on the wireless device, among possible uses.

20 Claims, 6 Drawing Sheets

(56) References Cited

U.S. PATENT DOCUMENTS

| | | | |
|---|---|---|---|
| 2006/0223442 A1* | 10/2006 | Stephens | H04L 1/0002 455/67.11 |
| 2008/0320108 A1* | 12/2008 | Murty | H04W 48/20 709/220 |
| 2011/0136478 A1* | 6/2011 | Trigui | H04W 24/02 455/418 |
| 2011/0201340 A1* | 8/2011 | Lunden | H04W 48/20 455/447 |
| 2012/0014251 A1* | 1/2012 | Arnott | H04L 5/0007 370/232 |
| 2012/0307701 A1* | 12/2012 | Moe | H04W 52/0206 370/311 |
| 2013/0176844 A1 | 7/2013 | Xia et al. | |
| 2013/0242943 A1 | 9/2013 | Zhou et al. | |
| 2014/0126388 A1 | 5/2014 | Shin et al. | |
| 2014/0187243 A1* | 7/2014 | Rune | H04W 36/04 455/436 |
| 2014/0192642 A1 | 7/2014 | Medapalli | |
| 2014/0211648 A1 | 7/2014 | Rahmati et al. | |
| 2014/0328193 A1 | 11/2014 | Horn et al. | |
| 2014/0362776 A1* | 12/2014 | Tian | H04W 48/20 370/329 |
| 2015/0023341 A1* | 1/2015 | Zhao | H04W 48/18 370/338 |
| 2015/0031367 A1 | 1/2015 | Singh et al. | |
| 2015/0071304 A1 | 3/2015 | Li et al. | |
| 2015/0078351 A1* | 3/2015 | An | H04W 28/22 370/336 |
| 2015/0124605 A1 | 5/2015 | Gholmieh et al. | |
| 2015/0131435 A1 | 5/2015 | Kasslin et al. | |
| 2015/0131483 A1* | 5/2015 | Colban | H04W 48/16 370/254 |
| 2015/0230158 A1 | 8/2015 | Kim et al. | |
| 2015/0312831 A1* | 10/2015 | Sang | H04W 36/0083 370/236 |
| 2015/0350018 A1 | 12/2015 | Hui et al. | |
| 2015/0365952 A1* | 12/2015 | Wang | H04L 65/4076 370/329 |
| 2016/0234792 A1* | 8/2016 | Zhuang | H04W 52/0206 |
| 2016/0278007 A1 | 9/2016 | Gokhale | |

OTHER PUBLICATIONS

Intel Corporation, "WLAN/3GPP access network selection based on maximum achievable rate metric", Discussion and Decision, 3rd Generation Partnership Project Meeting #81bis, Apr. 15-19, 2013, 8 pages, Chicago, USA.

Gerasimenko et al., "Characterizing Performance of Load-Aware Network Selection in Multi-Radio (WiFi/LTE) Heterogeneous Networks", Globecom 2013 Workshop, Dec. 9-13, 2013, 6 pages.

Qualcomm Incorporated, "RAN assisted Throughput estimation in Idle mode for WLAN-RAN interworking", Discussion and Approval, Feb. 10-14, 2014, 3 pages, Prague, Czech Republic.

Han et al., "Nonintrusive Estimation of Expected Throughput for IEEE 802.11 Devices", The 10th Annual IEEE CCNC—Network Games, Jan. 10-13, 2014, 6 pages, Seoul, Korea.

* cited by examiner

| | 502 | 504 | 506 | 508A | 508B | 508C | | 510A | 510B | 510C | |
|---|---|---|---|---|---|---|---|---|---|---|---|
| | Element ID | Length 1 | Type | DL_ATL_R1 | DL_ATL_R2 | DL_ATL_R3 | ... | UL_ATL_R1 | UL_ATL_R2 | UL_ATL_R3 | ... |
| Bits | 8 | 7 | 1 | 8 | 8 | 8 | | 8 | 8 | 8 | |

| | | 512 | 514A | | 514N |
|---|---|---|---|---|---|
| | Length 2 | Neighbor AP MACID | ... | Neighbor AP MACID |
| Bits | 4 | 8 | | 8 |

WIRELESS NETWORK THROUGHPUT ESTIMATION

PRIORITY INFORMATION

This application claims priority to U.S. provisional patent application Ser. No. 62/020,423, entitled "Wireless Network Throughput Estimation," filed Jul. 3, 2014, which is hereby incorporated by reference in its entirety as though fully and completely set forth herein.

FIELD

The present disclosure relates to wireless communication, including techniques for estimating throughput of a wireless network.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communication technologies tend to naturally lend themselves to use under mobile conditions. As such, wireless communication systems may sometimes have higher numbers of wireless devices present, and sometimes have lower numbers of wireless devices present. At least some wireless communication technologies may exhibit variable performance depending (among various other possible reasons) on the density of devices in wireless communication systems configured according to those wireless communication technologies. For example, a wireless network might have limited resources, such that a device in that network may be able to obtain more throughput with a smaller density of devices than with a larger density of devices in the network.

SUMMARY

This document describes, inter alia, methods for estimating potential throughput of wireless device in a wireless network, and describes wireless devices configured to implement the described methods.

According to the techniques described herein, a wireless device may determine the estimated actual temporal load(s) available for a new node in a wireless network. The estimated actual temporal load(s) may include uplink and/or downlink estimated actual temporal loads for the new node.

As one possibility, such information may be signaled to the wireless device by an access point device providing the wireless network. For example, the information can be included in beacon broadcasts. As another possibility, the wireless device may estimate this information by monitoring the wireless medium.

Such information may be used, in combination with an estimation of the data rate that the wireless device would be able to use in the wireless network, to estimate either or both of the uplink throughput and the downlink throughput that the wireless device would be able to obtain in the wireless network.

Such techniques may be used by a wireless device with respect to multiple networks, for example if the wireless device is within communicative range of multiple wireless networks and is determining which of the available wireless networks to join or associate with. For example, a wireless device may select a wireless network on which the estimated uplink throughput, downlink throughput, or both uplink and downlink throughput is highest among the available wireless networks, and join the selected network. In this way, the wireless device may be able to select the best available wireless network to join from a throughput perspective before actually associating with the wireless network.

As a further possibility, such techniques may be used by a wireless device to determine an initial data transfer rate to use in conjunction with an application capable of a variety of possible data transfer rates. For example, for a video chat application executing on a wireless device that utilizes an adaptive data rate, with the techniques described herein it may be possible to obtain a stable high data rate (and correspondingly high video quality) upon initiation of the application, for example based on throughput estimation of a wireless network with which the wireless device is associated. This may provide an improved user experience, for example in contrast to initiating the application with a minimal data rate and correspondingly low video quality and only gradually obtaining a higher data rate and improved video quality.

The techniques described herein may be implemented in and/or used with a number of different types of devices, including but not limited to access point devices, cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system that connects to the first computer system over a network, such as the Internet. In the latter instance, the second computer system may provide program instructions to the first computer for execution. The term "memory medium" may include two or more memory mediums that may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices that are mobile or portable and that performs wireless communications. Examples of STAs include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) that is easily transported by a user and capable of wireless communication.

Base Station or Access Point (AP)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics that result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 1:
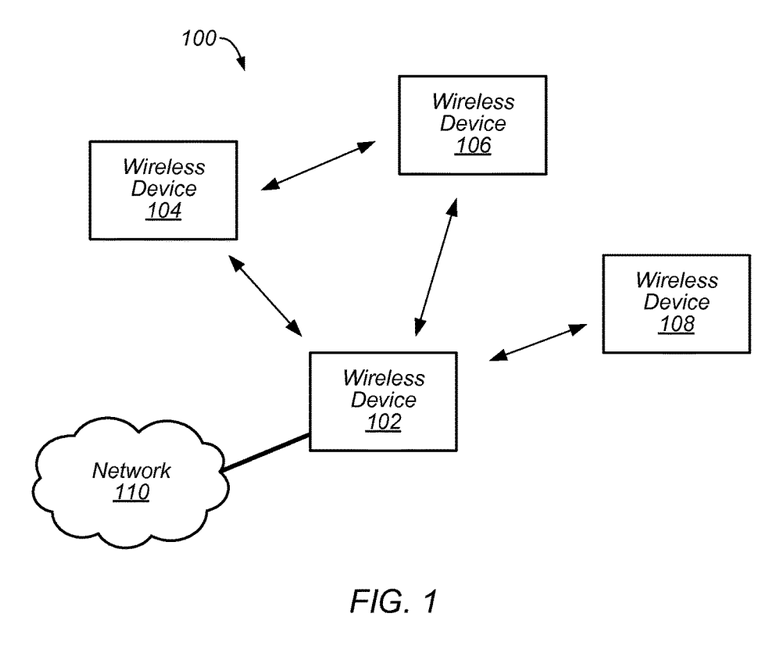
FIGS. 1-2 illustrate exemplary (and simplified) wireless communication systems.
Figure 2:
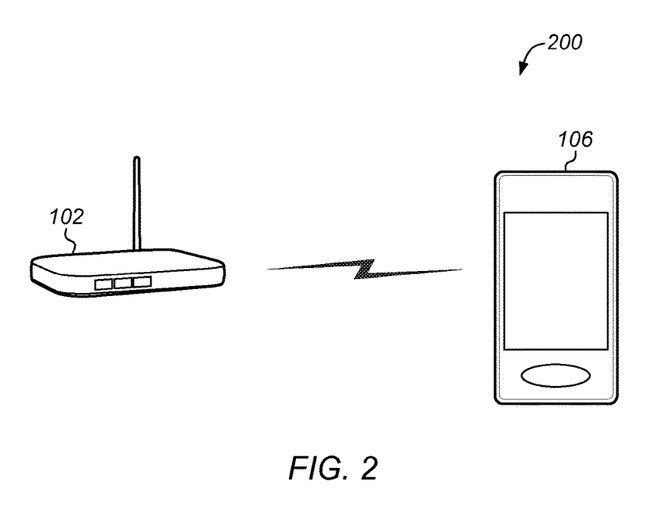

FIGS. 1-2—Communication System

FIG. 1 illustrates an exemplary (and simplified) wireless communication system 100 in which aspects of the present disclosure may be implemented, according to some embodiments. It is noted that the system 100 of FIG. 1 is only one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or fewer numbers (i.e., any arbitrary number) of wireless devices.

As shown, the exemplary wireless communication system 100 includes multiple wireless devices 102-108, which can communicate over at least one transmission medium. Some or all of the wireless devices may be substantially mobile devices ("stations" or "STAs"). Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. Wireless device 108 may, however, be able to indirectly detect wireless devices 104 and 106, e.g., via wireless device 102. The wireless devices 102-108 may be configured to perform IEEE 802.11 (Wi-Fi) wireless communication and/or other forms of wireless communication according to aspects of the present disclosure.

One or more of the wireless devices may be equipped to communicate with one or more external networks. For example, as shown, wireless device 102 may be communicatively coupled to network 110. The external network(s) may be any of a variety of types of networks, such as a cellular service provider's core network, the Internet, or an organization's intranet, among various possibilities.

Note that in some instances, the wireless devices may be capable of communicating prior to associating to form a wireless network. Such 'pre-association' communication may include exchange of network, device and/or service discovery related information by way of beacons, probe requests and responses, generic advertisement service queries and responses, etc., and/or exchange of information for associating together (e.g., for a STA to join the wireless network of an AP, for two STAs to form a peer-to-peer association, etc.). Such pre-association information advertisement and/or exchange may help devices to determine whether to join a network prior to spending time and consuming power to associate with that network.

Note that one or more of the wireless devices 102-108 may be capable of communicating using multiple wireless communication technologies. For example, one or more of the wireless devices 102-108 may be configured to communicate using at least one wireless networking technology (e.g., Wi-Fi) and/or peer-to-peer wireless communication technology (e.g., BT, Wi-Fi peer-to-peer, etc.) and at least one cellular communication technology (e.g., GSM, UMTS, LTE, LTE-Advanced (LTE-A), HSPA, 3GPP2 CDMA2000 (e.g., 1×RTT, 1×EV-DO, HRPD, eHRPD), etc.). Any or all of wireless devices 102-108 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication technology, if desired. Other combinations of wireless communication technologies (including more than two wireless communication technologies) are also possible.

Figure 4:
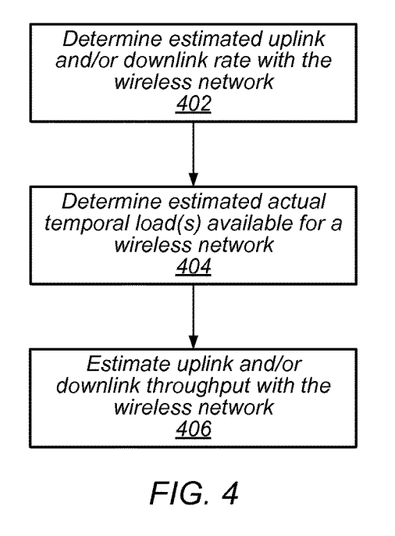
FIG. 4 is a flowchart diagram illustrating aspects of an exemplary method for estimating load and throughput of a wireless network.

Any or all of the wireless devices 102-108 and/or the network 110 illustrated in FIG. 1 may be configured to implement or support implementation of part or all of the methods described herein, including, inter alia, the method of FIG. 4.

FIG. 2 illustrates an exemplary wireless communication system 200 in which possible example aspects of the system 100 of FIG. 1 are represented, according to some embodiments. As shown, in the illustrated system wireless device 106 may be a mobile station (STA) 106 and wireless device 102 may be an access point 102 (also referred to as an "AP", or alternatively as a "base station" or "BS"). The STA 106 may be a user device with Wi-Fi communication capability such as a mobile phone, a handheld device, a wearable device, a computer or a tablet, fixed wireless device, or virtually any type of wireless device. The AP 102 may be an access point device with Wi-Fi communication capability such as a wireless router or other wireless access point.

Either or both of the AP 102 and the STA 106 may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
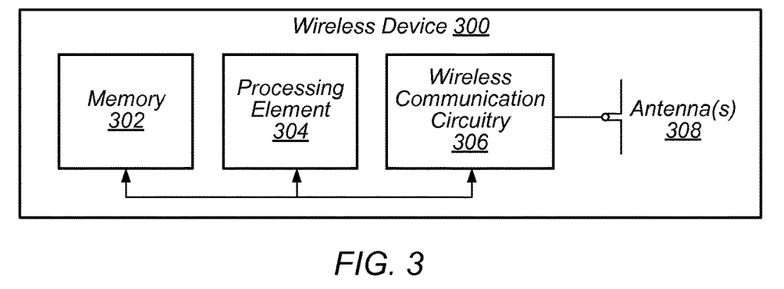
FIG. 3 illustrates a block diagram of an exemplary wireless device.

FIG. 3—Exemplary Block Diagram of a Wireless Device

FIG. 3 illustrates an exemplary block diagram of a wireless device 300 that may be configured for use in conjunction with various aspects of the present disclosure. The device 300 may be any of a variety of types of device and may be configured to perform any of a variety of types of functionality. For example, the device 300 may be a substantially portable device (a mobile device), such as a mobile phone, a personal productivity device, a computer or a tablet, a handheld gaming console, a portable media player, etc. Alternatively, the device 300 may be a substantially stationary device, such as a television, a subwoofer, speaker, or other audio rendering device, a wireless access point, a set-top box, etc.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and include one or more radios. In general, a radio may include any combination of a baseband processor, analog RF signal processing circuitry (e.g., including filters, mixers, oscillators, amplifiers, etc.), or digital processing circuitry (e.g., for digital modulation as well as other digital processing). The radio may implement one or more receive and transmit chains using the aforementioned hardware. In some instances, the wireless device 300 may share one or more parts of a receive and/or transmit chain between multiple wireless communication technologies, such as those discussed above. The wireless communication circuitry may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may providing processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source) user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing features for estimating load and throughput of a wireless network, such as those described herein with reference to, inter alia, FIG. 4.

FIG. 4—Flowchart Diagram

Currently, a wireless device in a IEEE 802.11 (Wi-Fi) network may be able to measure its throughput after associating with the Wi-Fi access point providing the network and exchanging data packets on the network. This may lead to situations in which a wireless device associates with a network that does not provide the maximum throughput among wireless networks available to the wireless device, but is unable to reliably determine that this is the case and select another network that would provide greater throughput with which to associate.

A mechanism for a wireless device to estimate its potential throughput before joining the basic service set (BSS) of an access point (i.e., joining the wireless network provided by that access point) and potentially without requiring any data packet exchange might thus be useful for wireless devices to make more informed selection of which wireless network to join when multiple wireless networks are available.

As one possible such mechanism, a wireless device may be able to estimate its throughput in a given wireless network based on received signal strength indicator (RSSI) and/or signal to noise ratio (SNR) measurements. For example, the RSSI value x of signals received from the access point providing the wireless network may be expected to correspond to a particular SNR value y, which may in turn be mapped to an estimated supported data rate z.

Such an approach may not work well, however, in a loaded network in which many network nodes are competing to access the wireless medium, since in this case the medium may be limited by contention among wireless devices (e.g., STAs and APs) using the wireless medium.

Accordingly, FIG. 4 is a flowchart diagram illustrating such a method for estimating the throughput of a wireless network (such as a Wi-Fi network) prior to (or after) associating with the wireless network, which may take into account loading of the wireless network.

The method may utilize the concept of temporal load. Temporal load may be a fraction of time used for data transfer. The concept of temporal load may further be refined by considering the concepts of requested (or required) temporal load and actual temporal load. The requested temporal load (RTL) of a given node in a wireless network may be the fraction of time that would be required to fully serve the traffic of the given node. The RTL may be a value between 0 and 1 (inclusive): a value close to (or equal to) 0 may indicate that the node has a low traffic load, while a value close to (or equal to) 1 may indicate that the node has a high traffic load. It should be noted that the sum of RTLs from contending nodes may be larger than 1; this may be an indication that the nodes of the network may not be fully satisfied by the resources available in the wireless network.

The actual temporal load (ATL) of a given node in a wireless network may be the actual fraction of time used to serve the traffic of the given node. In general, the ATL of a given node may be less than or equal to the node's RTL. For example, in a lightly loaded network in which there are sufficient resources to fully serve the traffic of all nodes, each node's ATL may be equal to its RTL, but in a highly loaded network in which there are insufficient resources to fully serve the traffic of all nodes, at least some nodes may be allocated fewer network resources than needed to fully serve the traffic of those nodes, which may result in those nodes having ATLs that are less than their RTLs. It should be noted that the sum of ATLs of all contending nodes in a wireless network should be no larger than 1 (i.e., since a sum value of 1 represents a scenario in which all network resources are allocated).

A wireless device may be able to utilize this concept according to the example method of FIG. 4 to determine estimated uplink and/or downlink throughput of the wireless device in a given wireless network based on an estimation of the data rate that the wireless device would be able to obtain in that wireless network and an estimation of how much actual temporal load would be available to a new node entering the network with the wireless device's estimated data rate.

The method shown in FIG. 4 may be used in conjunction with any of the computer systems or devices shown in the above Figures, among other devices. Some of the method elements shown may be performed concurrently, in a different order than shown, may be substituted for by other method elements, or may be omitted. Additional method elements may also be performed as desired. As shown, the method may operate as follows.

The wireless device may estimate (and possibly store information indicating) an uplink data rate and/or a downlink data rate that the wireless device would achieve if associated with a wireless network (402). For example, the wireless device may measure the signal strength (e.g., RSSI and/or other metrics) of the access point providing the wireless network. This RSSI may be mapped to a signal to noise ratio (SNR), which may in turn be mapped to an expected PHY data rate (or separate expected uplink and downlink PHY data rates) that the wireless device may expect to obtain as part of that wireless network. For example, a wireless device that is relatively close to an access point and experiences a high RSSI and SNR may be able to use a higher PHY data rate when communicating with the access point than a wireless device that is further away from the access point and experiences a lower RSSI and SNR.

The wireless device may determine (and possibly store information indicating) estimated uplink and/or downlink actual temporal load available to the wireless device in the wireless network (404). Such a determination may be made autonomously by the wireless device or based on an indication received from another wireless device.

For example, an access point that provides the wireless network might monitor the wireless network for a period of time to determine current actual temporal loads of each of the uplink and downlink nodes in the wireless network. Based on these current actual temporal loads, and further based on the particular resource allocation policy of the access point, the access point may be able to predict (estimate) the expected actual temporal load that would be available for a new network node for uplink communication, and/or the expected actual temporal load that would be available for a new network node for downlink communication. Depending on the nature of the resource allocation policy, these expected actual temporal loads may either depend on the data rate of the new network node, or may be rate independent.

For example, as one possible resource allocation policy, the access point might schedule packet transmissions using the same amount of time for each wireless device in the network. In such a case, the expected downlink and uplink actual temporal loads that would be available to a new network node may not depend on the data rate of the new network node (i.e., may be applicable to all data rates).

As another possible resource allocation policy, the access point might schedule packet transmissions such that packets of the same size (a fixed packet size in bits) may be allocated to each wireless device in the network. In such a case, the expected downlink and uplink actual temporal loads that would be available to a new network node may depend on the data rate of the new network node, since a greater actual temporal load may be allocated to a wireless device with a lower data rate in order to accommodate the fixed packet size than to a wireless device with a higher data rate that may be able to accommodate the fixed packet size in a shorter temporal transmission window.

Thus, depending on the resource allocation policy of the access point, the access point may estimate the downlink and uplink actual temporal loads that would be available for a new network node. In the case of a fixed packet length in time resource allocation policy, one estimated downlink actual temporal load and one estimated uplink actual temporal load may be applicable for any new wireless node, regardless of the data rate of that wireless node. In the case of a fixed packet size in bits resource allocation policy, it may be the case that the access point estimates the downlink actual temporal load and the estimated uplink actual temporal load that would be available to a new wireless node for each of multiple possible data rates of the new wireless node.

After performing such estimation, the access point may provide an indication of the estimated uplink and/or downlink actual temporal load available to a new network node in the wireless network for one or more data rates (e.g., depending on the resource allocation policy, as noted above) to wireless devices within communicative range by way of a broadcast communication. The wireless device might thus receive this indication and determine estimated actual temporal load available to the wireless device based on this indication. As a specific example, an access point might broadcast such information in a load information element, which might be included in periodic beacon frame transmissions or load information frame transmissions.

In the case that the estimated downlink and uplink actual temporal loads indicated by the access point are data rate independent, the wireless device may directly determine that the estimated actual temporal loads available for the wireless device in the wireless network may be those indicated by the access point. However, in the case that the estimated downlink and uplink actual temporal loads indicated by the access point are data rate dependent, the wireless device may perform a further step to determine the estimated actual temporal loads available for the wireless device in the wireless network. For example, if the uplink and/or downlink data rate of the wireless device is different than all of the data rates corresponding to the estimated actual temporal load values indicated by the access point, the wireless device may interpolate between the values indicated by the access point to determine an estimated uplink actual temporal load available for the wireless device in the wireless network given the estimated uplink data rate of the wireless device in the wireless network, and an estimated downlink actual temporal load available for the wireless device in the wireless network given the estimated downlink data rate of the wireless device in the wireless network.

As an alternative to determining estimated actual temporal loads available to the wireless device in a wireless network based on information indicated by another device, the wireless device may autonomously determine the estimated actual temporal load(s) available to the wireless device in a wireless network. This may include monitoring the wireless medium on which communication is performed in the wireless network. For example, the wireless device may monitor transmissions on the medium (using physical carrier sensing, virtual carrier sensing, or a combination thereof) to determine the actual temporal load of each uplink and downlink node utilizing the medium over a period of time. Each transmission on the medium may, for example, be monitored to determine the direction of transmission (uplink or downlink) and the source and destination nodes. Each transmission may also be monitored to determine the transmission data rate (e.g., from the SIG field in packet headers).

Once the wireless device has determined the current resource allocation in the network by monitoring the wireless medium of the wireless network for the given period of time, the wireless device may then predict (estimate) the uplink and downlink actual temporal load that would be available to a new node in the wireless network after resource re-allocation based on the current resource allocation in the wireless network (and possibly based on the estimated data rate(s) of the wireless device in the wireless network).

Note that this estimation may also be based on a determination (or an assumption) of a resource allocation policy used by the wireless network, since the manner in which network resources are re-allocated to accommodate a new network node may depend on the resource allocation policy of the wireless network. Thus, based on the current actual temporal loads and transmission/reception data rates of uplink and downlink nodes in the wireless network, the wireless device may for example infer whether the access point providing the wireless network follows a fixed packet length in time resource allocation policy, a fixed packet size in bits resource allocation policy, or another resource allocation policy, and estimate the uplink and downlink actual temporal load that would be available to a new node in the wireless network after resource re-allocation based on the determined resource allocation policy. Alternatively, if the wireless device is unable (or not configured) to infer the resource allocation policy of the access point providing the network, the wireless device may estimate the uplink and downlink actual temporal load available to a new node in the wireless network according to multiple possible resource allocation policies and take an average (e.g., a simple or weighted average) of those estimates. As a still further possibility, the access point may provide an explicit or implicit indication of its resource allocation policy.

The wireless device may estimate (and possibly store information indicating) the uplink throughput and/or downlink throughput the wireless device could expect to realize in the wireless network (406). The uplink throughput and/or downlink throughput may be estimated based on the estimated data rate(s) of the wireless device in the wireless network and the estimated actual temporal load(s) of the wireless device in the wireless network. For example, to determine an estimated possible uplink throughput that the wireless device might be able to obtain in the wireless network, the wireless device might multiply the estimated uplink actual temporal load available to the wireless device in the wireless network by the estimated uplink data rate of the wireless device in the wireless network. Similarly, to determine an estimated possible downlink throughput that the wireless device might be able to obtain in the wireless network, the wireless device might multiply the estimated downlink actual temporal load available to the wireless device in the wireless network by the estimated downlink data rate of the wireless device in the wireless network.

If desired, the wireless device may estimate either or both of uplink throughput or downlink throughput of the wireless device in the wireless network. Furthermore, if desired, the wireless device may estimate a blended throughput, for example if the wireless device expects to perform bi-directional communication on the wireless network. The blended rate may be a weighted summation of the estimated uplink throughput and the estimated downlink throughput, with weights for each selected based on an expected traffic blend (e.g., proportions of uplink and downlink traffic expected by the wireless device) and summing to unity, as one possibility.

The wireless device may perform such throughput estimation with respect to multiple wireless networks, in some instances. For example, the wireless device may be within communicative range of multiple wireless networks, and may obtain (e.g., by receiving indications or and/or autonomously determining) the estimated data rate(s), and the estimated actual temporal load(s) of the wireless device in each of those available wireless networks and perform throughput estimation with respect to each of those available wireless networks on the basis of that information.

At least in some instances, the wireless device may select a wireless network to join based at least in part on estimating the uplink throughput and/or the downlink throughput of the wireless device with respect to each of the wireless networks for which such estimation is performed. For example, the wireless device might select a wireless network to join based on which wireless network has the highest estimated uplink throughput, downlink throughput, or blended throughput (e.g., depending on the priority of the wireless device at the time; note that the AP providing the highest downlink throughput may be different from the AP providing the highest uplink throughput) of the available wireless networks for which throughput estimation is performed. The wireless device may then join (associate with) the selected wireless network.

As a further possibility, the wireless device may select an initial application data rate of a networking application executing on the wireless device based at least in part on the estimated uplink and downlink throughput of the wireless device in a given wireless network. For example, for an application that utilizes an adaptive data rate (e.g., a media streaming application, a voice or video chat application, etc.), instead of initiating the application with a minimal data rate and correspondingly low video quality and only gradually obtaining a higher data rate and improved video quality, the wireless device may select as an initial data rate for the application a maximum data rate supported by the estimated actual temporal load(s) and data rate(s) for the wireless device in a wireless network with which the wireless device is associating or with which the wireless device is already associated.

Figure 5:
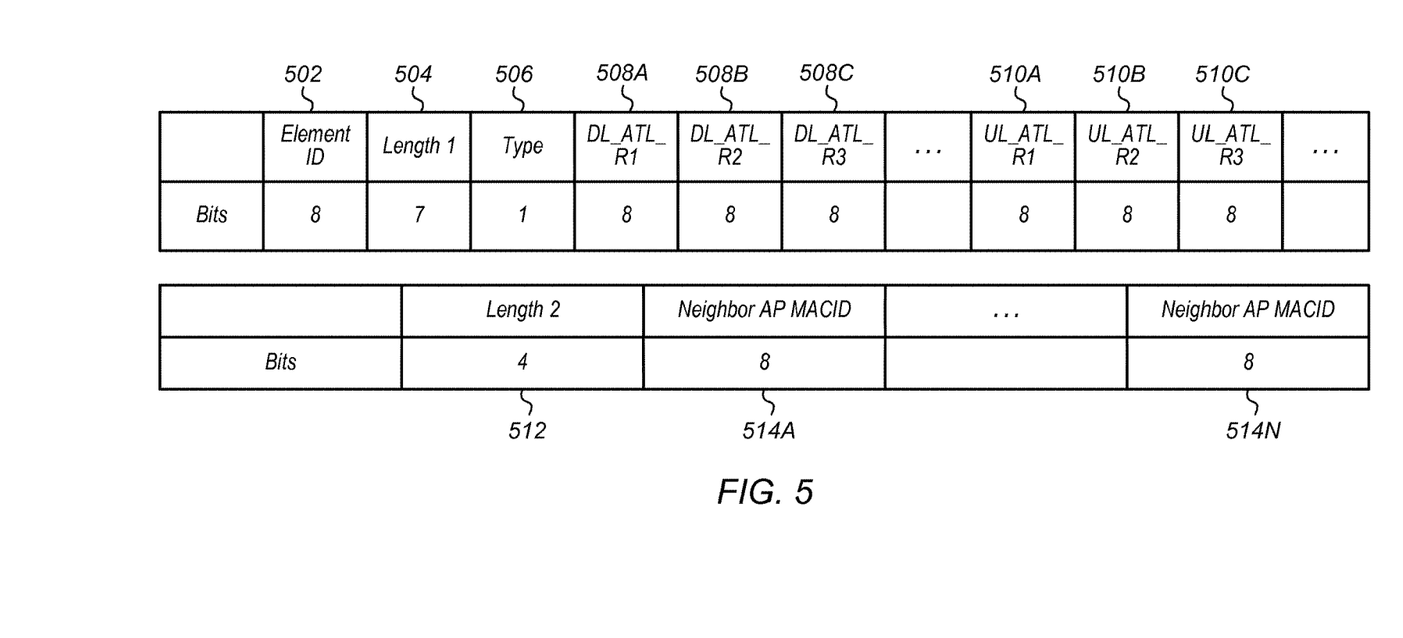
FIG. 5 illustrates an exemplary possible format for providing temporal load information from an AP to a STA.

FIG. 5—Exemplary Possible Temporal Load Information Format

FIG. 5 and the information provided herein below in conjunction therewith are provided by way of example of various considerations and details relating to a possible IEEE 802.11 wireless communication system in which the method of FIG. 4 may be implemented, and are not intended to be limiting to the disclosure as a whole. Numerous variations and alternatives to the details provided herein below are possible and should be considered within the scope of the disclosure.

FIG. 5 illustrates an exemplary Temporal Load information element (IE) that may be used by an access point providing a wireless network to signal how much actual temporal load would be available to a new network node, according to some embodiments. As shown, the IE may include element ID 502, length 1 504, and (possibly) type 506 fields, as well as a variable number of fields 508, 510 for indicating possible actual temporal load values. The element ID field 502 may indicate the type of the IE, while the length 1 field 504 may specify the total length of all actual temporal load fields. The type field 506 may be used to indicate whether the actual temporal load fields provide rate-independent actual temporal load values (e.g., in which case one rate independent downlink actual temporal load value and one rate independent uplink actual temporal load value may be provided) or rate-dependent actual temporal load values (e.g., in which case multiple downlink actual temporal load values and multiple uplink actual temporal load values may be provided, with each value providing the actual temporal load corresponding to a particular data rate). Alternatively, instead of including a type field to explicitly indicate whether rate-depending or rate-independent actual temporal load values are provided, it is also possible to implicitly indicate rate dependency of actual temporal load values, for example by way of the number of actual temporal load values included in the IE. That is, if there is only one pair of actual temporal load values (e.g., one for uplink and the other for downlink), then they may be treated as rate independent actual temporal load values. Otherwise, they may be considered rate dependent. The actual temporal load values themselves may be provided in the actual temporal load fields 508, 510. For example, as shown, downlink actual temporal load values and uplink temporal load values might be provided for each of multiple rates R1 (508A, 510A), R2 (508B, 510B), R3 (508C, 510C), etc. (e.g., 10 Mbps, 30 Mbps, 60 Mbps, or any other desired rates).

As shown, the IE may also include a length 2 field 512 and a variable number of Neighbor AP MACID fields 514A-N. The length 2 field 512 may indicate the number of following Neighbor AP MACID fields. The Neighbor AP MACID fields 514A-N may each indicate the lower octet of each neighbor AP's actual MAC address. The number of such fields included may depend on the number of APs neighboring the AP generating the IE.

Such an IE may be periodically transmitted by an AP in beacon transmissions or otherwise broadcast to STAs within communicative range of the AP to provide such STAs with an updated indication of the current uplink and downlink actual temporal load that is estimated to be available to a new node joining the wireless network provided by the AP.

Figure 6:
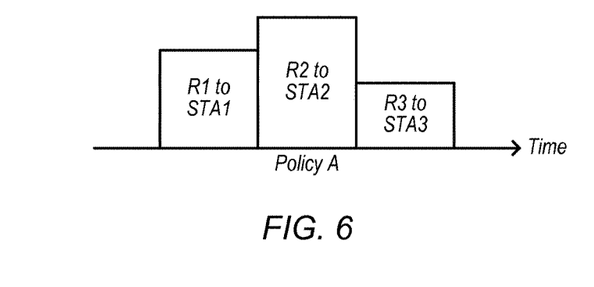
FIGS. 6-7 illustrate two different possible example downlink resource allocation policies of a wireless network.
Figure 7:
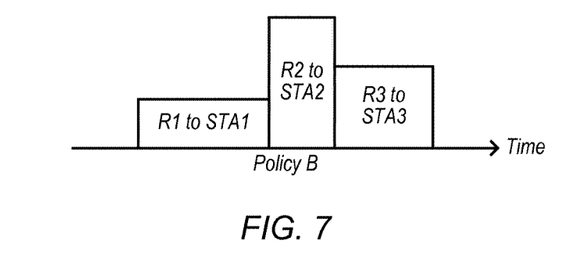

FIGS. 6-7—Exemplary Resource Allocation Polices in a Wireless Network

FIGS. 6-7 and the information provided herein below in conjunction therewith are provided by way of example of various considerations and details relating to a possible IEEE 802.11 wireless communication system in which the method of FIG. 4 may be implemented, and are not intended to be limiting to the disclosure as a whole. Numerous variations and alternatives to the details provided herein below are possible and should be considered within the scope of the disclosure.

In particular, FIGS. 6-7 illustrate aspects of two possible example resource allocation policies that may be used in a wireless network, for example based on the configuration of the access point providing the wireless network.

FIG. 6 illustrates a resource allocation policy ("Policy A") in which when the AP schedules packet transmissions, the same amount of time is allocated to each STA regardless of its transmission rate. Under such a policy, if a STA supports high data rates, packets to the STA could for example be aggregated to provide higher throughput within the allocated temporal transmission window than for a STA that supports only lower data rates.

FIG. 7 illustrates a resource allocation policy ("Policy B") in which when the AP schedules packet transmissions, it sends packets of the same size to all STAs. Since different STAs may have different data rates, this may result in different STAs being allocated different sized temporal transmission windows in order to accommodate the fixed packet size used by the AP.

Figure 8:
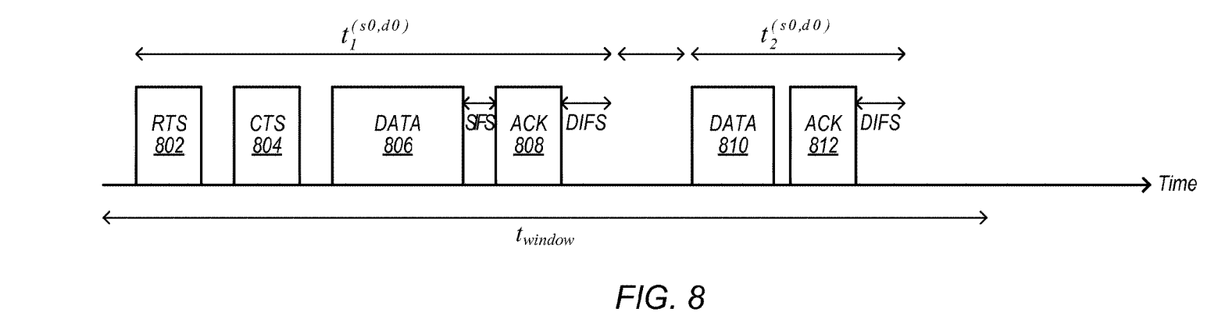
FIG. 8 illustrates aspects of an exemplary technique for a STA to estimate temporal load of a wireless network.

FIG. 8—Exemplary Current Actual Temporal Load Estimation in a Wireless Network FIG. 8 and the information provided herein below in conjunction therewith are provided by way of example of various considerations and details relating to a possible IEEE 802.11 wireless communication system in which the method of FIG. 4 may be implemented, and are not intended to be limiting to the disclosure as a whole. Numerous variations and alternatives to the details provided herein below are possible and should be considered within the scope of the disclosure.

In particular, FIG. 8 illustrates one possible example sequence of transmissions on a wireless medium between a particular source (s0) and destination (d0). A first transaction may include request-to-send (RTS) 802, clear-to-send (CTS) 804, data 806, and acknowledgement 808 frames, with SIFS intervals between frames and a DIFS interval after completion of the frames, and may last for a length of time of $t_1$. A second transaction may include data 810 and acknowledgement 812 frames, with a SIFS interval between the frames and a DIFS interval after completion of the frames, and may last for a length of time of $t_2$. The transactions may occur over a total temporal window lasting a length of time of $t_{window}$.

As previously noted, the actual temporal load of a given node may be the fraction of time the medium is busy for data transfer for that node. This may include inter-frame spaces, such as SIFS and DIFS intervals between packets in Wi-Fi.

Accordingly, for the illustrated sequence of transmissions, the actual temporal load for this particular source and destination may be calculated by an AP or STA monitoring the wireless medium as:

$$ATL_{(s0,d0)} = \frac{t_1^{(s0,d0)} + t_2^{(s0,d0)}}{t_{window}}.$$

Similar calculations may be performed for each source and destination pair that uses the wireless medium over the total temporal window considered by the AP or STA to determine the current temporal load of each uplink and/or downlink node of the wireless network.

FIGS. 9-12—Exemplary Resource Allocation and Re-Allocation in a Wireless Network FIGS. 9-12 and the information provided herein below in conjunction therewith are provided by way of example of various considerations and details relating to a possible IEEE 802.11 wireless communication system in which the method of FIG. 4 may be implemented, and are not intended to be limiting to the disclosure as a whole. Numerous variations and alternatives to the details provided herein below are possible and should be considered within the scope of the disclosure.

As previously noted, the resource allocation policy or policies used to distributed network resources in a wireless network may affect the actual temporal load obtained by each contending node in the wireless network on some occasions, such as if the sum of the RTLs of all nodes in the network is greater than 1 (i.e., greater than the available resources of the network).

Figure 9:
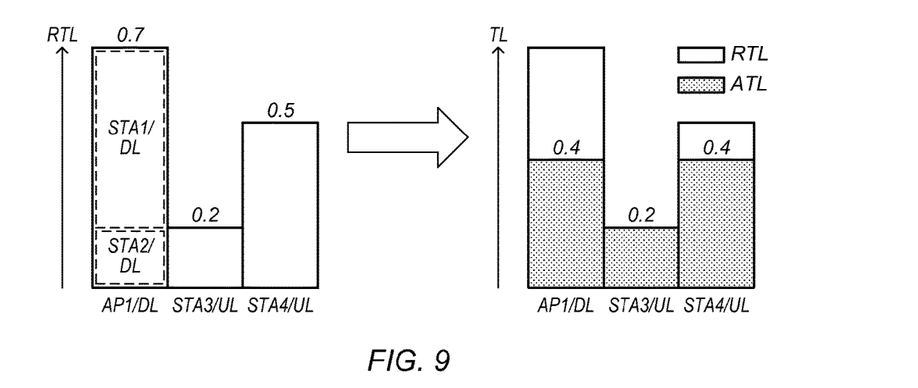
FIGS. 9-10 illustrate one exemplary possible resource allocation scenario for a wireless network.

FIG. 9 illustrates how such resource allocation may occur on an inter-node basis under a fixed packet length in time resource allocation policy (Policy A) according to one possible example scenario. In the illustrated scenario, each bar in the graph corresponds to one contending node in the wireless network (i.e., an AP or STA with uplink data to transmit). As shown, the RTL of AP1 may represent the downlink RTL of two STAs (STA1 and STA2), and AP1 may contend with two STAs (STA3 and STA4) that have uplink RTLs for medium access.

The total area covered by the bars may represent the total temporal resources that would be required to serve all of the traffic (e.g., 0.7 RTL for AP1, 0.2 RTL for STA3, and 0.5 RTL for STA4). However, since this amount is greater than the total available temporal resources, the amount of resources actually available to each node may be determined by Wi-Fi's carrier sensing multiple access (CSMA) techniques. In this case, each node may obtain up to a proportion of the total available temporal resources equal to all other contending nodes, with any excess temporal resources available from nodes that do not require as many temporal resources being distributed among the remaining contending nodes. Thus, in the illustrated scenario, the AP may obtain an ATL of 0.4, STA3 may obtain an uplink ATL of 0.2, and STA4 may obtain an uplink ATL of 0.4.

Figure 10:
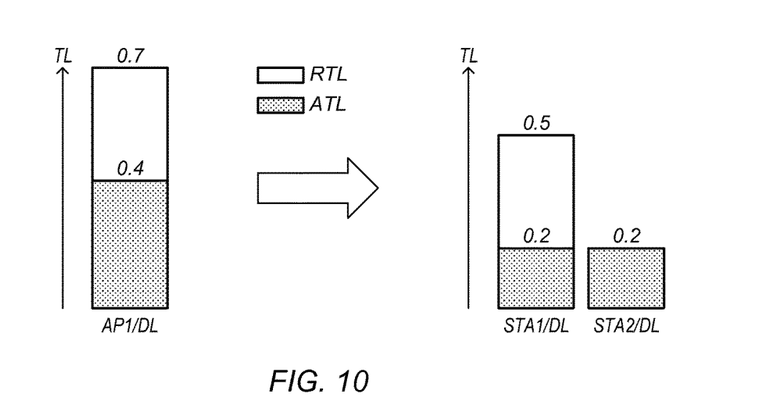

FIG. 10 illustrates an example of how such resource allocation may occur on an intra-node basis under a fixed packet length in time resource allocation policy following upon the example scenario of FIG. 9. In the illustrated scenario, AP1 had an RTL of 0.7 representing an RTL of 0.5 corresponding to STA1 and an RTL of 0.2 corresponding to STA2, but obtained an ATL of 0.4 after contending with STA3 and STA4 for network resources. Accordingly, AP1 may allocate its temporal resources as illustrated, such that STA1 is allocated a downlink ATL of 0.2, and STA2 is also allocated a downlink ATL of 0.2.

Figure 11:
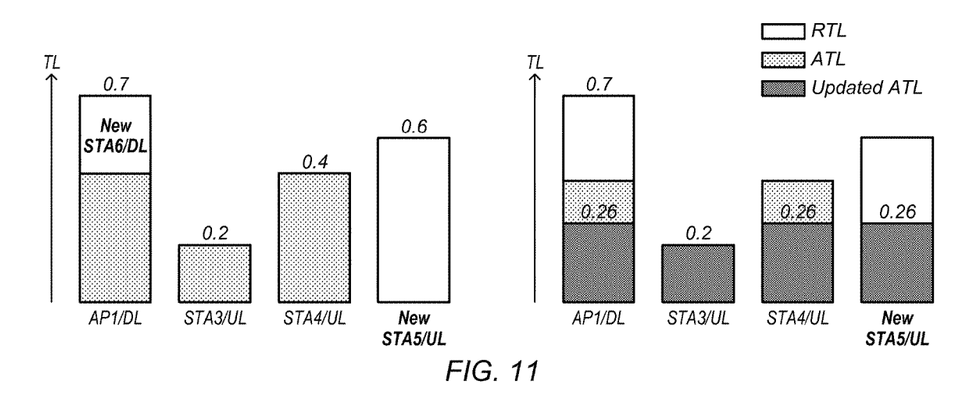
FIGS. 11-12 illustrate an exemplary possible resource re-allocation scenario for a wireless network in which addition of a new node to the wireless network is considered.
Figure 12:
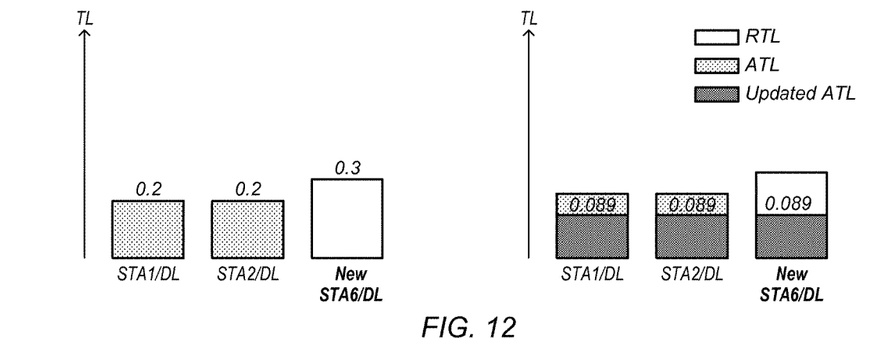

FIGS. 11-12 illustrate examples of how resource re-allocation or re-distribution might occur upon entrance of a new node to such a system. In particular, FIG. 11 illustrates an example of inter-node resource re-distribution and FIG. 12 illustrates an example of intra-node resource re-distribution with a new node following upon the exemplary scenarios of FIGS. 9-10.

In the illustrated scenario shown in FIGS. 11-12, a new uplink node (STA5) with an uplink RTL of 0.6 and a new downlink node (STA6) with a downlink RTL of 0.3 may join the system of FIGS. 9-10. As shown in FIG. 11, after intra-node resource re-allocation according to the CSMA contending mechanism, STA3 may still obtain an uplink ATL of 0.2, but AP1, STA4, and STA5 may each obtain an ATL of 0.26. As shown in FIG. 12, the reduced ATL of AP1 may then be re-distributed on an intra-node basis to STA1, STA2, and STA6 such that each may obtain a downlink ATL of 0.089 (i.e., 0.266/3).

It should be noted that (at least for intra-node resource allocation) a simple 'water pouring' type algorithm such as illustrated in the scenarios of FIGS. 9-12 may not be used for a fixed packet length in bits type resource allocation policy. For example, the amount of temporal resources assigned to each STA per access may be different for different STAs that support different data rates such that nodes with lower supported data rates may obtain more temporal resources.

Additional Information

The following information is provided by way of example of various considerations and details relating to a possible IEEE 802.11 wireless communication system in which the method of FIG. 4 may be implemented, and are not intended to be limiting to the disclosure as a whole. Numerous variations and alternatives to the details provided herein below are possible and should be considered within the scope of the disclosure.

As previously noted, in order to estimate the throughput that a new node entering a wireless network would be able to obtain according to the method of FIG. 4, an AP or a STA may determine the actual temporal load that would be available to a new uplink and/or downlink node in the wireless network. As also previously noted, the manner in which temporal resources are distributed (at least for intra-node resource distribution) may depend on the resource allocation policy of the AP providing the wireless network. The following section provides further details on how such ATL computation may be performed according to certain resource allocation policies.

Consider first the following notations that may be used in this section:

$TL_i^{jDL}$ may be the downlink (requested or actual) temporal load of STA i associated with AP j;

$TL^{jDL}$ may be the sum of all downlink (requested or actual) temporal loads of the STAs associated with AP j;

$TL_i^{UL}$ may be the uplink (requested or actual) temporal load of STA i; and $N_j$ may be the number of downlink STAs associated with AP j.

Each AP j may add up all the TLs for DL STAs associated with it:

$$TL^{jDL} = \sum_{i=1}^{N_j} TL_i^{jDL}.$$

Inter-node resource distribution or 'water pouring' may be performed across contending APs and UL STAs. Each competing AP may use its combined DL TL ($TL^{jDL}$), and each competing STA may use its UL TL ($TL_i^{UL}$); the new node may use its RTL:

$$[ATL^{jDL}\forall j, ATL_i^{UL}\forall i] = \text{water-pouring}(TL^{jDL}\forall j, TL_i^{UL}\forall i, 1).$$

Thus, new ATLs may be determined, such that the sum of output ATLs is less than or equal to 1.

Intra-AP resource distribution may next be performed for each AP j to determine the ATL of each DL STA under the AP. The total available temporal load may be $ATL^{DL}$ (e.g., as determined based on inter-node temporal resource distribution):

$$[ATL_i^{jDL}\forall i] = \text{water-pouring}(TL_i^{jDL}\forall i, ATL^{jDL}).$$

In general terms, the resource distribution or "water pouring" algorithm water-pouring([TL], w) may be a function that produces an output vector t'=[$ATL_1$, $ATL_2$, ..., $ATL_N$] based on an input vector t=[$TL_1$, $TL_2$, ..., $TL_N$] and a budget w. If the sum ([$TL_1$, $TL_2$, ..., $TL_N$]) is less than or equal to w, then $ATL_i$=$TL_i$ for all i. Otherwise, the ATL computation depends on the resource allocation policy.

For a fixed packet length in time resource allocation policy, the ATL computation may first include ordering the TLs in ascending order. Without loss of generality, it may be assumed that $TL_1 \leq TL_2 \leq \ldots \leq TL_N$. Given this, each $ATL_i$ may be found according to the following rule from i=1 to N in order:

$$ATL_i = \min(TL_i, M_i)$$

$$M_i = \left(w - \sum_{k=1}^{i-1} ATL_k\right) \frac{1}{N-(i-1)}.$$

For a fixed packet size in bits resource allocation policy, let $$G_i = m_i - TL_i \text{ for } i = 1 \text{ to } N,$$

$$\text{with } m_i = \frac{R_i^{-1}}{\sum_{k=1}^{N} R_k^{-1}};$$

Order $G_i$ in descending order; without loss of generality, it may be assumed that $m_1-TL_1 \geq m_2-TL_2 \geq \ldots \geq m_N-TL_N$. Given this, each $ATL_i$ may be found according to the following rule from i=1 to N in order:

$$ATL_i = \min(TL_i, M_i)$$

$$M_i = \left(w - \sum_{k=1}^{i-1} ATL_k\right) \frac{R_i^{-1}}{\sum_{k=1}^{N} R_k^{-1}}.$$

In the following further exemplary embodiments are provided.

One set of embodiments may include a method, including: by a wireless device: determining estimated uplink and downlink actual temporal load available to the wireless device in a wireless network; determining and storing estimated uplink and downlink rates of the wireless device in the wireless network; and estimating and storing uplink and downlink throughput of the wireless device in the wireless network, wherein at least one of the uplink throughput and downlink throughput is useable by the wireless device for wireless network selection.

According to some embodiments, the method can further include performing the determining estimated uplink and downlink actual temporal load available to the wireless device, determining estimated uplink and downlink rates of the wireless, and estimating uplink and downlink throughput of the wireless device with respect to each of multiple available wireless networks.

According to some embodiments, the method can further include selecting a wireless network to join using the estimated uplink and downlink throughput of the wireless device with respect to each of the multiple available wireless networks.

According to some embodiments, selecting the wireless network to join can include selecting a wireless network in which the estimated uplink throughput and/or downlink throughput of the wireless device is highest among the multiple available wireless networks.

According to some embodiments, the method can further include estimating a blended uplink and downlink throughput of the wireless device in the wireless network, wherein the blended uplink and downlink throughput of the wireless device in the wireless network is estimated by weighting and summing the estimated uplink throughput and the estimated downlink throughput of the wireless device in the wireless network based on an expected traffic blend of the wireless device.

According to some embodiments, determining estimated uplink and downlink actual temporal load available to the wireless device, determining estimated uplink and downlink rates of the wireless device, and estimating uplink and downlink throughput of the wireless device in the wireless network can be performed while the wireless device is not associated with the wireless network.

According to some embodiments, determining estimated uplink and downlink actual temporal load available to the wireless device in a wireless network includes receiving an indication of uplink and downlink actual temporal loads available to a wireless device in the wireless network from an access point providing the wireless network.

According to some embodiments, determining estimated uplink and downlink actual temporal load available to the wireless device in the wireless network includes monitoring the wireless medium of the wireless network over a period of time to determine actual temporal load, direction of transmission, and data rates for each source and destination pair to determine current resource allocation in the wireless network.

According to some embodiments, determining estimated uplink and downlink actual temporal load available to the wireless device in the wireless network can further include estimating uplink and downlink actual temporal load available to a new node in the wireless network after resource re-allocation using the determined current resource allocation in the wireless network.

According to some embodiments, the method further includes selecting an initial application data rate of an application executing on the wireless device using the estimated uplink and downlink throughput of the wireless device in the wireless network.

A further set of embodiments may include a wireless device, including a radio; and a processing element; wherein the radio and the processing element are configured to: determine that multiple wireless networks are available within communicative range of the wireless device; determine one or more of estimated uplink actual temporal load or downlink actual temporal load available to the wireless device in each of the wireless networks; determine one or more of an estimated uplink data rate or a downlink data rate of the wireless device in each of the wireless networks; and estimate one or more of an uplink throughput or a downlink throughput of the wireless device in each of the wireless networks.

According to some embodiments, the radio and the processing element are further configured to: measure a received signal strength indicator (RSSI) value of each of the wireless networks, wherein determining one or more of the estimated uplink data rate or the estimated downlink data rate of the wireless device in each of the wireless networks uses the measured RSSI value of each of the wireless networks.

According to some embodiments, the radio and the processing element are further configured to: receive beacon broadcasts from each of the wireless networks, wherein at least a subset of beacon broadcasts from the wireless networks include information indicating one or more of estimated uplink actual temporal load or estimated downlink actual temporal load available to a new network node.

According to some embodiments, the information indicating one or more of estimated uplink actual temporal load or estimated downlink actual temporal load available to a new network node provided by at least one wireless network includes a plurality of estimated uplink and downlink actual temporal load values, wherein each estimated uplink or downlink actual temporal load value corresponds to a new network node having a particular data rate.

According to some embodiments, the radio and the processing element are further configured to: interpolate between provided estimated uplink actual temporal load values to obtain an estimated uplink actual temporal load value corresponding to a new network node having the estimated uplink data rate of the wireless device if multiple estimated uplink actual temporal load values are provided by a wireless network; and interpolate between provided estimated downlink actual temporal load values to obtain an estimated downlink actual temporal load value corresponding to a new network node having the estimated downlink data rate of the wireless device if multiple estimated downlink actual temporal load values are provided by a wireless network.

According to some embodiments, the radio and the processing element are further configured to: select a wireless network to join of the wireless networks based on one or more of the uplink throughput or the downlink throughput of the wireless device in each of the wireless networks; and associate with the selected wireless network.

Yet another set of embodiments may include a method, including: by a wireless access point device: providing a wireless network on a wireless channel; monitoring traffic on the wireless channel to determine current actual temporal load for each active uplink and downlink node in the wireless network; estimating actual uplink temporal load and actual downlink temporal load available to a new network node at one or more data rates based on the current actual temporal load for each active uplink and downlink node in the wireless network and a resource allocation policy of the wireless access point device; and periodically broadcasting the estimated actual uplink temporal load and actual downlink temporal load available to a new network node at the one or more data rates.

According to some embodiments, the resource allocation policy of the wireless access point device can include scheduling packet transmissions for each respective wireless device in the wireless network with a fixed packet size in bits, wherein estimating actual uplink temporal load and actual downlink temporal load available to a new network node is performed for each of multiple possible data rates.

According to some embodiments, the resource allocation policy of the wireless access point device can include scheduling packet transmissions for each respective wireless device in the wireless network with a fixed packet length in time, wherein the estimated actual uplink temporal load and actual downlink temporal load available to a new network node is applicable to all data rates.

According to some embodiments, the method can further include periodically updating the estimated actual uplink temporal load and actual downlink temporal load available to a new network node at the one or more data rates.

According to some embodiments, the wireless access point device operates according to IEEE 802.11, wherein the wireless network is an IEEE 802.11 network.

According to some embodiments, the estimated actual uplink temporal load and actual downlink temporal load available to a new network node at the one or more data rates are broadcast in one or more of a beacon frame transmission or a load information frame transmission.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method, comprising:
by a wireless device, prior to associating with a wireless network:
determining estimated uplink and downlink actual temporal load of the wireless device in the wireless network, wherein the actual temporal load is the actual fraction of time used to serve the traffic of the wireless device, wherein determining the estimated uplink and downlink actual temporal load of the wireless device in the wireless network is based at least in part on a resource allocation policy of the wireless network;
determining and storing estimated uplink and downlink rates of the wireless device in the wireless network;
estimating and storing uplink and downlink throughput of the wireless device in the wireless network, wherein said estimating is based on the estimated uplink and downlink actual temporal load of the wireless device and the estimated uplink and downlink rates of the wireless device; and selecting a wireless network, wherein the uplink and downlink throughput is used by the wireless device for said selecting.

2. The method of claim 1, further comprising:
performing said determining estimated uplink and downlink actual temporal load of the wireless device, determining estimated uplink and downlink rates of the wireless device, and estimating uplink and downlink throughput of the wireless device with respect to each of a plurality of available wireless networks.

3. The method of claim 2, further comprising:
selecting a wireless network to join using the estimated uplink and downlink throughput of the wireless device with respect to each of the plurality of available wireless networks.

4. The method of claim 3,
wherein selecting the wireless network to join comprises selecting a wireless network in which the estimated uplink throughput and/or downlink throughput of the wireless device is highest among the plurality of available wireless networks.

5. The method of claim 1, further comprising:
estimating a blended uplink and downlink throughput of the wireless device in the wireless network,
wherein the blended uplink and downlink throughput of the wireless device in the wireless network is estimated by weighting and summing the estimated uplink throughput and the estimated downlink throughput of the wireless device in the wireless network based on an expected traffic blend of the wireless device.

6. The method of claim 1,
wherein determining estimated uplink and downlink actual temporal load of the wireless device in a wireless network comprises receiving an indication of uplink and downlink actual temporal loads available to a wireless device in the wireless network from an access point providing the wireless network.

7. The method of claim 1,
wherein determining estimated uplink and downlink actual temporal load available to the wireless device in the wireless network further comprises monitoring, over a period of time, a wireless medium of the wireless network to determine actual temporal load, direction of transmission, and data rates for each source and destination pair to determine current resource allocation in the wireless network.

8. The method of claim 1,
wherein determining estimated uplink and downlink actual temporal load of the wireless device in the wireless network is based at least in part on actual temporal load for at least one other individual wireless device associated with the wireless network to determine current resource allocation in the wireless network.

9. The method of claim 1, the method further comprising:
selecting an initial application data rate of an application executing on the wireless device using the estimated uplink and downlink throughput of the wireless device in the wireless network.

10. A wireless device, comprising:
a radio;
a non-transitory memory medium comprising program instructions; and
a processor;
wherein the processor is configured to execute the program instructions to:

determine that a plurality of wireless networks are available within communicative range of the wireless device;
determine estimated uplink actual temporal load and downlink actual temporal load of the wireless device in each of the plurality of wireless networks, wherein the actual temporal load is the actual fraction of time used to serve the traffic of the wireless device, wherein the actual fraction of time used to serve the traffic of the wireless device is estimated based at least in part on actual temporal load for at least one other individual wireless device and at least in part on a resource allocation policy of each of the plurality of wireless networks;
determine an estimated uplink data rate and a downlink data rate of the wireless device in each of the plurality of wireless networks;
estimate an uplink throughput and a downlink throughput of the wireless device in each of the plurality of wireless networks; and
select a wireless network to join of the plurality of wireless networks using the estimated uplink throughput and downlink throughput of the wireless device in each of the plurality of the wireless networks.

11. The wireless device of claim 10, wherein the processor is further configured to:
measure a received signal strength indicator (RSSI) and/or signal to noise power ratio (SNR) value of each of the plurality of wireless networks,
wherein determining one or more of the estimated uplink data rate or the estimated downlink data rate of the wireless device in each of the plurality of wireless networks uses the measured RSSI and/or SNR value of each of the plurality of wireless networks.

12. The wireless device of claim 10, wherein the processor is further configured to:
receive beacon broadcasts from each of the plurality of wireless networks,
wherein at least a subset of beacon broadcasts from the plurality of wireless networks comprise information indicating one or more of estimated uplink actual temporal load or estimated downlink actual temporal load available to a new network node.

13. The wireless device of claim 12,
wherein the information indicating one or more of estimated uplink actual temporal load or estimated downlink actual temporal load available to a new network node provided by at least one wireless network comprises a plurality of estimated uplink and downlink actual temporal load values, wherein each estimated uplink or downlink actual temporal load value corresponds to a new network node having a particular data rate.

14. The wireless device of claim 13, wherein the processor is further configured to:
interpolate between provided estimated uplink actual temporal load values to obtain an estimated uplink actual temporal load value corresponding to a new network node having the estimated uplink data rate of the wireless device if a plurality of estimated uplink actual temporal load values are provided by a wireless network; and
interpolate between provided estimated downlink actual temporal load values to obtain an estimated downlink actual temporal load value corresponding to a new network node having the estimated downlink data rate of the wireless device if a plurality of estimated downlink actual temporal load values are provided by a wireless network.

15. A method, comprising:

by a wireless access point device:

providing a wireless network on a wireless channel;

monitoring traffic on the wireless channel to determine current actual temporal load for each individual active uplink and downlink node in the wireless network, wherein said actual temporal load is the actual fraction of time used to serve the traffic of each individual active uplink and downlink node;

estimating actual uplink temporal load and actual downlink temporal load available to a new network node at one or more data rates based on the current actual temporal load for each individual active uplink and downlink node in the wireless network and a resource allocation policy of the wireless access point device; and periodically broadcasting the estimated actual uplink temporal load and downlink temporal load available to a new network node at the one or more data rates.

16. The method of claim 15, wherein the resource allocation policy of the wireless access point device comprises scheduling packet transmissions for each respective wireless device in the wireless network with a fixed packet size in bits, wherein estimating actual uplink temporal load and actual downlink temporal load available to a new network node is performed for each of a plurality of possible data rates.

17. The method of claim 15, wherein the resource allocation policy of the wireless access point device comprises scheduling packet transmissions for each respective wireless device in the wireless network with a fixed packet length in time, wherein the estimated actual uplink temporal load and actual downlink temporal load available to a new network node is applicable to all data rates.

18. The method of claim 15, the method further comprising:

periodically updating the estimated actual uplink temporal load and actual downlink temporal load available to a new network node at the one or more data rates.

19. The method of claim 15, wherein the estimated actual uplink temporal load and actual downlink temporal load available to a new network node at the one or more data rates are broadcast in one or more of a beacon frame transmission or a load information frame transmission.

20. The wireless device of claim 10, wherein the actual fraction of time used to serve the traffic of the wireless device is estimated based at least in part on a resource allocation policy of the network.

* * * * *